United States Patent
Zheng et al.

(10) Patent No.: US 10,140,103 B2
(45) Date of Patent: Nov. 27, 2018

(54) POS APPLICATION DEVELOPMENT METHOD AND CLOUD SERVER

(71) Applicant: PAX COMPUTER TECHNOLOGY (SHENZHEN) CO., LTD., Shenzhen (CN)

(72) Inventors: Renchi Zheng, Shenzhen (CN); Lihong Xie, Shenzhen (CN); Jianghui Cao, Shenzhen (CN); Langming Tan, Shenzhen (CN)

(73) Assignee: Pax Computer Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/107,199

(22) PCT Filed: Aug. 18, 2015

(86) PCT No.: PCT/CN2015/087318
§ 371 (c)(1),
(2) Date: Jun. 22, 2016

(87) PCT Pub. No.: WO2016/187972
PCT Pub. Date: Dec. 1, 2016

(65) Prior Publication Data
US 2017/0139691 A1    May 18, 2017

(30) Foreign Application Priority Data

May 27, 2015 (CN) .......................... 2015 1 0280486

(51) Int. Cl.
*G06F 8/41* (2018.01)
*G06F 9/44* (2018.01)
(Continued)

(52) U.S. Cl.
CPC .............. *G06F 8/41* (2013.01); *G06F 8/60* (2013.01); *G06F 8/71* (2013.01); *G06F 9/44* (2013.01);
(Continued)

(58) Field of Classification Search
None
See application file for complete search history.

(56) References Cited

U.S. PATENT DOCUMENTS

| 8,504,664 B2 * | 8/2013 | Ye ........................ H04L 41/044 379/207.13 |
| 2008/0270514 A1 * | 10/2008 | Soares Pi Farias .... G06Q 20/20 709/202 |

(Continued)

FOREIGN PATENT DOCUMENTS

| CN | 101203000 | 6/2008 |
| CN | 101425114 | 5/2009 |
| CN | 104834530 | 8/2015 |

OTHER PUBLICATIONS

Serrano, Nicolas, Josune Hernantes, and Gorka Gallardo. "Mobile web apps." IEEE software 30.5 2013: 22-27. Retrieved on [Jul. 20, 2018] Retrieved from the Internet:URL<https://ieeexplore.ieee.org/stamp/stamp.jsp?tp=&arnumber=6588524>.*

(Continued)

*Primary Examiner* — Thuy Dao
*Assistant Examiner* — Cheneca Smith
(74) *Attorney, Agent, or Firm* — Rankin, Hill & Clark LLP

(57) ABSTRACT

An embodiment of the present invention provides a point of sale (POS) application development method and a cloud server, which are configured to realize development and deployment of an application through the cloud server so as to shorten the development cycle of the POS application. The method of the embodiment of the present invention (Continued)

includes: by a cloud server, receiving and saving application project data transmitted from a web client; by the cloud server, processing the application project data and obtaining an application package; by the cloud server, performing signature processing for the application package and obtaining a signed application package; by the cloud server, transmitting the signed application package to a POS so that the POS realizes an corresponding application based on the signed application package. Another embodiment of the present invention further provides a cloud server.

14 Claims, 1 Drawing Sheet

(51) Int. Cl.
  G06F 8/60 (2018.01)
  H04L 29/08 (2006.01)
  G06Q 20/20 (2012.01)
  G06F 8/71 (2018.01)
  G06Q 20/38 (2012.01)
(52) U.S. Cl.
  CPC ......... *G06Q 20/202* (2013.01); *G06Q 20/382* (2013.01); *H04L 29/08* (2013.01); *H04L 67/12* (2013.01); *H04L 67/34* (2013.01); *H04L 67/10* (2013.01); *H04L 69/329* (2013.01)

(56) References Cited

U.S. PATENT DOCUMENTS

| | | | |
|---|---|---|---|
| 2009/0217259 A1* | 8/2009 | Winter | G06F 8/63 717/174 |
| 2011/0016202 A1* | 1/2011 | Ye | H04L 41/044 709/222 |
| 2012/0180029 A1* | 7/2012 | Hill | G06Q 10/06 717/135 |
| 2013/0144701 A1* | 6/2013 | Kulasooriya | G06Q 20/202 705/14.24 |
| 2013/0205277 A1* | 8/2013 | Seven | G06F 8/38 717/121 |
| 2013/0332896 A1* | 12/2013 | Narayana | G06Q 10/06 717/101 |
| 2014/0068583 A1* | 3/2014 | Tejani | G06F 8/54 717/163 |
| 2014/0259003 A1* | 9/2014 | Devarajan | G06F 8/65 717/172 |

OTHER PUBLICATIONS

Holzer et al. "Trends in mobile application development." International Conference on Mobile Wireless Middleware, Operating Systems, and Applications. Springer, Berlin, Heidelberg, 2009. Retrieved on [Jul. 20, 2018] Retrieved from the Internet: URL<https://link.springer.com/chapter/10.1007/978-3-642-03569-2_6>.*

* cited by examiner

POS APPLICATION DEVELOPMENT METHOD AND CLOUD SERVER

FIELD OF THE INVENTION

The present application relates to the application field of point of sale (Point of Sale, POS), especially to a POS application development method and a cloud server.

BACKGROUND OF THE INVENTION

Currently, in the aspect of POS application development, traditional development languages, such as C/C++ and JAVA, are still carried on as before both in China and abroad; in interface development, the character interface development mode is adopted mostly even after the popularization of color screens.

A current POS application development method is as follows: a technician adopts C language to develop and debug in a personal computer (Personal Computer, PC), obtains an expected application, releases and verifies the application artificially, and then uploads the application to a terminal management system; a POS downloads the application from the terminal management system.

However, releasing and verifying the application, and uploading the application to the terminal management system require manual intervention, which costs much time and prolongs the development cycle of the application.

SUMMARY OF THE INVENTION

An embodiment of the present invention provide a POS application development method and a cloud server, which are configured to realize development and deployment of an application through the cloud server so as to shorten the development cycle of the POS application.

One aspect of the present invention provides a POS application development method, including:

by a cloud server, receiving and saving application project data transmitted from a WEB client;

by the cloud server, processing the application project data and obtaining an application package;

by the cloud server, performing signature process for the application package and obtaining a signed application package;

by the cloud server, transmitting the signed application package to a POS, so that the POS realizes a corresponding application based on the signed application package.

In combination with the first aspect of the present invention, in a first embodiment of the first aspect of the present invention, the step of by the cloud server, transmitting the signed application package to a POS includes:

by the cloud server, receiving a push instruction transmitted from the WEB client; by the cloud server, transmitting the signed application package to the POS based on the push instruction;

In combination with the first aspect of the present invention, in a second embodiment of the first aspect of the present invention, the step of by the cloud server, transmitting the signed application package to a POS includes:

by the cloud server, receiving a request instruction transmitted from the POS; by the cloud server, transmitting the signed application package to the POS based on the request instruction.

In combination with the first aspect of the present invention, the first embodiment of the first aspect of the present invention or the second embodiment of the first aspect of the present invention, in a third embodiment of the first aspect of the present invention, after the step of by a cloud server, receiving and saving application project data transmitted from a WEB client, and before the step of by the cloud server, processing the application project data and obtaining an application package, the method further includes:

by the cloud server, receiving a modification instruction transmitted from the WEB client; by the cloud server, modifying the application project data based on the modification instruction.

In combination with the third aspect of the present invention, in a fourth embodiment of the first aspect of the present invention, the step of by the cloud server, processing the application project data and obtaining an application package includes:

by the cloud server, performing validity detection for the application project data;

by the cloud server, generating a compile file based on the application project data;

by the cloud server, generating a PB file based on the compile file;

by the cloud server, generating an application package based on the PB file;

by the cloud server, processing the application project package and obtaining the application package.

In combination with the fourth aspect of the present invention, in a fifth embodiment of the first aspect of the present invention, the step of by the cloud server, performing signature processing for the application package and obtaining a signed application package includes:

by the cloud server, verifying the application package;

when the verification of the application package is passed, by the cloud server, performing signature processing for the application package and obtaining the signed application package;

when the verification of the application package is not passed, by the cloud server, performing other steps.

A second aspect of the present invention provides a cloud server, including:

a receiving module configured to receive and save application project data transmitted from a WEB client;

a processing module configured to process the application project data and obtain an application package;

a signing module configured to perform signature process for the application package and obtain a signed application package;

a transmitting module configured to transmit the signed application package to a POS so that the POS realizes a corresponding application based on the signed application package.

In combination with the second aspect of the present invention, in a first embodiment of the second aspect of the present invention:

the receiving module is further configured to receive a push instruction transmitted from the WEB client;

the transmitting module is further configured to transmit the signed application package to the POS based on the push instruction;

alternatively, the receiving module is further configured to receive a request instruction transmitted from the POS;

the transmitting module is further configured to transmit the signed application package to the POS based on the request instruction.

In combination with the second aspect of the present invention or the first embodiment of the second aspect of the present invention, in a second embodiment of the second aspect of the present invention:

the receiving module is further configured to receive a modification instruction transmitted from the WEB client;

the processing module is further configured to modify the application project data based on the modification instruction.

In combination with the second embodiment of the second aspect of the present invention, in a third embodiment of the second aspect of the present invention:

the processing module is further configured to perform validity detection for the application project data;

the processing module is further configured to generate a compile file based on the application project data;

the processing module is further configured to generate a PB file based on the compile file;

the processing module is further configured to generate an application project package based on the PB file;

the processing module is further configured to process the application project package and obtain the application package.

As can be seen from the above technical solutions, the embodiments of the present invention possess the follow advantages:

the cloud server receives and saves application project data transmitted from a WEB client; the cloud server processes the application project data and obtains an application package; the cloud server performs signature processing for the application package and obtains a signed application package; the cloud server transmits the signed application package to a POS so that the POS realizes an corresponding application based on the signed application package. The cloud server processes the application project data, obtains the application package, performs signature process for the application package and transmits the signed application package to the POS. All the operations are operated by the cloud server, and the designer can complete the design of the POS application in the WEB client connected with the cloud server without accomplishing releasing and uploading of the application locally. Therefore, the present invention saves time and shortens the development cycle of the POS application.

BRIEF DESCRIPTION OF THE DRAWINGS

In order to explain the technical solutions of the embodiments of the present invention more clearly, drawings required being used in the descriptions of the embodiments and the prior art are briefly introduced as follows. Obviously, the drawings described as follows are merely some embodiments of the present invention. Those skilled in the art can obtain other drawings on the basis of these drawings without paying any creative work.

DETAILED DESCRIPTION OF THE PREFERRED EMBODIMENT

Embodiments of the present invention provide a POS application development method and a cloud server, which are configured to realize development and deployment of an application through the cloud server so as to shorten the development cycle of the POS application.

In order to help those skilled in the art better understand the technical solutions of the present invention, the technical solutions of the embodiments of the present invention will be described clearly and completely with reference to the figures of the embodiments of the present invention. Obviously, the embodiments described herein are merely some but not all of embodiments of the present invention. Based on the embodiments of the present invention, all the other embodiments obtainable by those skilled in the art without paying any creative work are all within the protection scope of the present invention.

The application will be described in detail as below through specific embodiments respectively.

Figure 1:
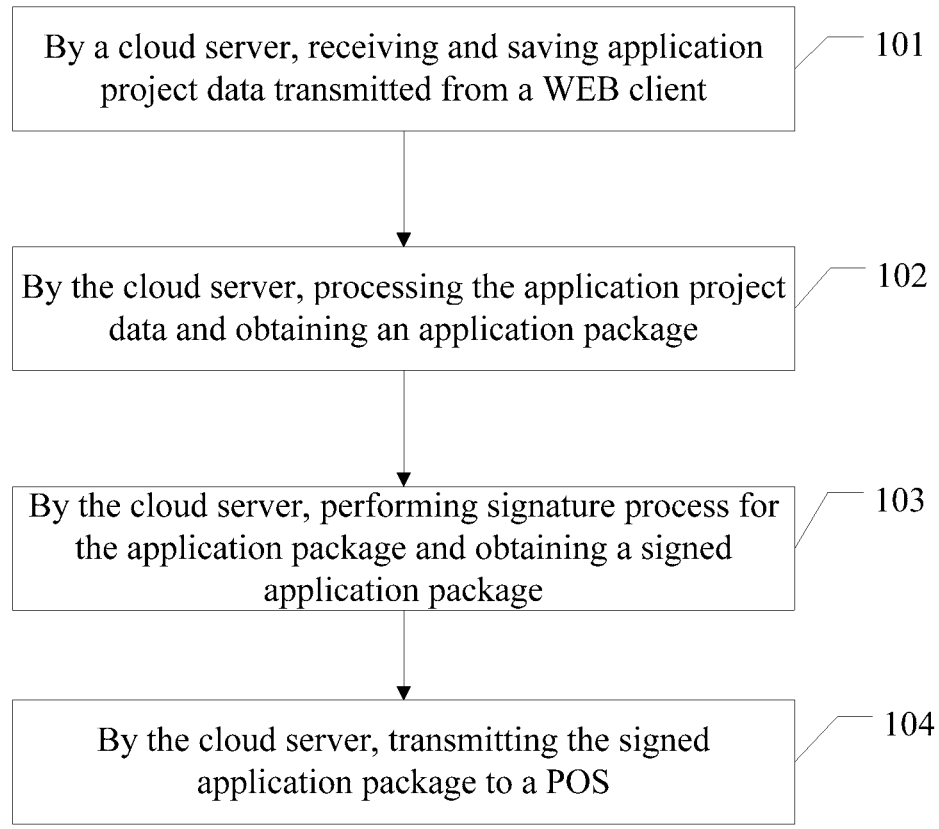
FIG. 1 is a schematic view of one embodiment of a POS application development method in the embodiments of the present invention.

Please refer to FIG. 1, an embodiment of the present invention provides a POS application development method which includes:

101. By a cloud server, receiving and saving application project data transmitted from a WEB client;

In the embodiment of the present invention, the WEB client has been connected with the cloud server. A designer designs an application in the WEB client and generates the application project data. The cloud server receives and saves the application project data transmitted from the WEB client.

102. By the cloud server, processing the application project data and obtaining an application package;

In the embodiment of the present invention, the cloud server compiles the received application project data, and obtains the application package.

103. By the cloud server, performing signature processing for the application package and obtaining a signed application package;

In the embodiment of the present invention, the cloud server performs signature processes for the application package obtained based on the application project data, and obtains a signed application package.

104. By the cloud server, transmitting the signed application package to a POS;

In the embodiment of the present invention, the cloud server transmits the signed application package to the POS so that the POS realizes a corresponding application based on the signed application package.

In the embodiment of the present invention, the cloud server receives and saves application project data transmitted from a WEB client; the cloud server processes the application project data and obtains an application package; the cloud server performs signature processing for the application package and obtains a signed application package; the cloud server transmits the signed application package to a POS so that the POS realizes an corresponding application based on the signed application package. The cloud server processes the application project data, obtains the application package, performs signature process for the application package and transmits the signed application package to the POS. All the operations are operated by the cloud server, and the designer can complete the design of the POS application in the WEB client connected with the cloud server without accomplishing releasing and uploading of the application locally. Therefore, the present invention saves time and shortens the development cycle of the POS application.

Optionally, in some embodiments of the present invention, the step of by the cloud server, transmitting the signed application package to a POS includes:

by the cloud server, receiving a push instruction transmitted from the WEB client;

by the cloud server, transmitting the signed application package to the POS based on the push instruction;

alternatively, by the cloud server, receiving a request instruction transmitted from the POS;

by the cloud server, transmitting the signed application package to the POS based on the request instruction.

In the embodiment of the present invention, there are two modes of transmitting the signed application package to the POS by the cloud server, thereby diversifying the scheme.

Optionally, in some embodiments of the present invention, after the step of by a cloud server, receiving and saving application project data transmitted from a WEB client, and before the step of by the cloud server, processing the application project data and obtaining an application package, the method further includes:

by the cloud server, receiving a modification instruction transmitted from the WEB client;

by the cloud server, modifying the application project data based on the modification instruction.

In the embodiment of the present invention, the cloud server modifies the application project data based on the modification instruction transmitted from the WEB client, so that the designer can accomplish real-time data interaction with the cloud server in the WEB client.

Optionally, in some embodiments of the present invention, the step of by the cloud server, processing the application project data and obtaining an application package includes:

by the cloud server, performing validity detection for the application project data;

by the cloud server, generating a compile file based on the application project data;

by the cloud server, generating a PB file based on the compile file;

by the cloud server, generating an application package based on the PB file;

by the cloud server, processing the application project package and obtaining the application package.

In the embodiment of the present invention, the step of by the cloud server, processing the application project data and obtaining an application package is refined by the steps relating to the application package such that the scheme is more explicit.

Optionally, in some embodiments of the present invention, the step of by the cloud server, performing signature processing for the application package and obtaining a signed application package includes:

by the cloud server, verifying the application package;

when the verification to the application package is passed, by the cloud server, performing signature processing for the application package and obtaining the signed application package;

when the verification to the application package is not passed, by the cloud server, performing other steps.

In the embodiment of the present invention, the step of by the cloud server, performing signature processing for the application package and obtaining a signed application package is refined such that the scheme is more explicit.

For better understanding, the POS application development method according to an embodiment of the present invention is described in detail according to an actual application environment as follows:

In the embodiment of the present invention, the POS application development method is realized in an online POS application development system based on WEB; a WEB client is connected with a cloud server and acts as an editing tool of a designer; the cloud server may include an application development server, a signature server and a terminal management server, etc. Wherein the application development server is configured to process application project data transmitted from the WEB client; the signature server is configured to perform signature processes for the application, and the terminal management server is configured to transmit the application to the POS.

The WEB client can operate WEB editing software supporting the fifth version of hypertext markup language (HyperText Markup Language 5, HTML5) or be used in a POS development application program. In the embodiment, the WEB editing software based on HTML5 is adopted; in the WEB editing software, the designer achieves single-screen interface design by designing an editing area, and realizes the design of visualized POS application through functions of the WEB editing software such as program view, attribute view, event design, toll bar, widget box, and so on, such that the designer can view the interface style of the application running in the POS during designing. The event design allows the designer to know and edit the motions performed when a widget event is triggered, thereby reducing the steps of code programming and logic processing for the designer. The WEB client transforms the designed POS application into application project data, sends the application project data to the cloud server, and saves the application project data into a local database, which ensures seamless editing after the internet goes offline; at the same time, the validity of the application project data in the local database can be ensured under a good internet circumstance, and it can be ensured that the application project data is the latest.

The cloud server receives the application project data transmitted from the WEB client; the application development server in the cloud server saves the application project data into the database; after the application is modified by the WEB client, the application development server modifies the corresponding application project data in the database so as to realize data synchronization, performs validity detection to the application project data, deletes and freezes the application project data which is invalid and generates a project report or the like thereof, generating the compile file, i.e., the HTML5 intermediate file, based on the application package data, performs validity detection on the HTML5 intermediate file, generates a PB file which is executable in the POS on the basis of the HTML5 intermediate file which passes the detection, composites the PB file and an application project resource file to obtain an application project package, processes the application project package to obtain the application package, and transmits the application package to a signature server to perform signature processing.

The signature server in the cloud server verifies the application package and determines whether the application in the application package meets the requirement. The specific processes are: submitting an application signature submitting application, triggering automatic verification function or switching to manual verification according to system configuration; after passing the application verification, abstracting an abstract information of a binary file of the application (can be but is not limited to hash value), and submitting it to a signer for signing, the returned signature information and the original application being used as a signature application together (the signature information may be added into the end of the original application file to generate a new file); when the verification is passed, performing signature processing for the application package to obtain a signed application package, and transmitting the signed application package to the terminal management server; when the verification is not passed, abandoning the process to the application package, and returning information that the application package is not signed to the WEB client.

The terminal management server of the cloud server receives the signed application package, and transmits the signed application package to the POS. The specific transmission mode can be: receiving the push instruction transmitted from the WEB client, and transmitting the signed application package to the specified POS based on the push instruction; alternatively, receiving a request instruction transmitted from the POS, and transmitting the signed application package to the corresponding POS based on the request instruction. The POS realizes the application required by the designer on the interface of the POS based on the signed application package.

The terminal server further provides the POS with online push and online monitoring services; after the application is developed and signed, the system manager can specify an application to be pushed to a specific POS terminal. The connecting type between the terminal management server and the online POS can be but is not limited to an Ethernet, a wireless communication network, a local area network, a wireless local area network, a VPN, and a telephone network. The online POS uploads the working condition and security information of the POS to the terminal management server periodically, and the information includes but is not limited to magnetic card swiping times, error record, IC card swiping times, error record, successful/failed trade times, printing length of a printer, and GPS information of the POS operation. The terminal management server can transmit the specified terminal events and statistic information to a mail, a mobile communication device, or a personal computer of the manager through a variety of modes which include but are not limited to email, SMS, page-pushing and real-time communication software. The browser framework of the HTML5-based POS includes an interface rendering plate, a script running plate, a variable managing plate and an event distributing plate, etc. The services provided by the POS include a jointly formulated financial smart IC card processing standard (Europay-Mastercard-Visa, EMV) service, a contactless card EMV service, a P2PE service, a white list service, an application management service and a terminal health service, etc. Wherein the server management service is a service that provides installing, uninstalling, starting and stopping of the application.

Figure 2:
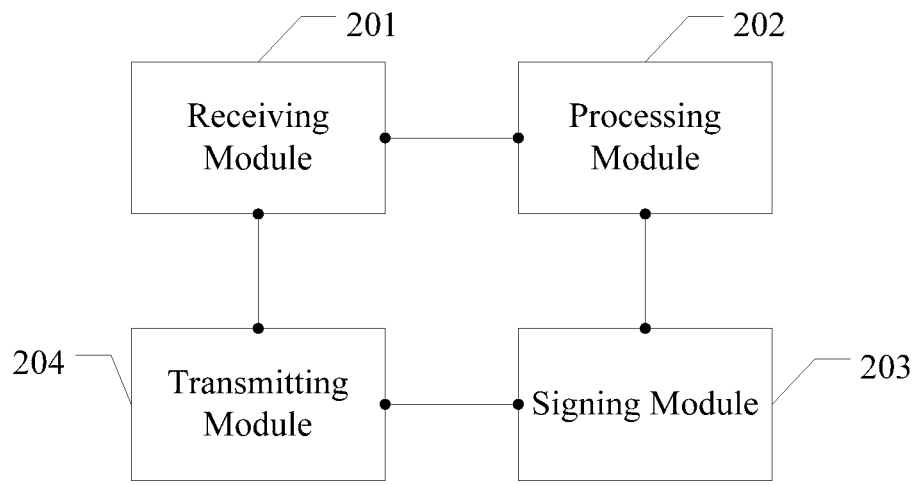
FIG. 2 is a schematic view of one embodiment of a cloud server in the embodiments of the present invention.

Please refer to FIG. 2, an embodiment of the present invention provides a cloud server which includes:

a receiving module 201 configured to receive and save application project data transmitted from a WEB client;

a processing module 202 configured to process the application project data and obtain an application package;

a signing module 203 configured to perform signature process the application package and obtain a signed application package;

a transmitting module 204 configured to transmit the signed application package to a POS so that the POS is able to realize corresponding application based on the signed application package.

In the embodiment of the present invention, the receiving module 201 receives and saves application project data transmitted from a WEB client; the processing module 202 processes the application project data and obtains an application package; the signing module signature processes the application package and obtains a signed application package; the transmitting module 204 transmits the signed application package to a POS so that the POS is able to realize corresponding application based on the signed application package. The processing module 202 processes the application project data and obtains the application package; the signing module 203 signature processes the application package; the transmitting module 204 transmits the signed application package to the POS. All the operations are operated by the cloud server, and the designer can complete the design of the POS application in the WEB client which is connected with the cloud server without accomplishing release and upload of the application locally. Therefore, the present invention saves time and shortens the development cycle of the POS application.

Optionally, in some embodiment of the present invention, the receiving module 201 is further configured to receive a push instruction transmitted from the WEB client;

the transmitting module 204 is further configured to transmit the signed application package to the POS based on the push instruction;

alternatively, the receiving module 201 is further configured to receive a request instruction transmitted from the POS;

the transmitting module 204 configured to transmit the signed application package to the POS based on the request instruction.

In the embodiment of the present invention, the transmitting module 204 classifies the modes of transmitting the signed application package to the POS into two, diversifying the scheme.

Optionally, in some embodiments of the present invention:

the receiving module 201 is further configured to receive a modification instruction transmitted from the WEB client;

the processing module 202 is further configured to modify the application project data based on the modification instruction.

In the embodiment of the present invention, the processing module 202 modifies the application project data based on the modification instruction transmitted from the WEB client received by the receiving module 201, so that the designer can accomplish real-time data interaction with the cloud server in the WEB client.

Optionally, in some embodiments of the present invention:

the processing module 202 is further configured to perform validity detection on the application project data;

the processing module 202 is further configured to generate a compile file based on the application project data;

the processing module 202 is further configured to generate a PB file based on the compile file;

the processing module 202 is further configured to generate an application project package based on the PB file;

the processing module 202 is further configured to process the application project package and obtain the application package.

In the embodiment of the present invention, the step that the processing module 202 processes the application project data and obtains an application package is refined such that the scheme is more explicit.

For better understanding, interactions among each module of the cloud server according to an embodiment of the present invention under an actual application environment are described in detail as follows:

In the embodiment of the present invention, the POS application development method is accomplished on the basis of an online POS application development system based on WEB; a WEB client is connected with a cloud server and acts as a editing tool for a designer; the cloud server may include an application development server, a signature server and a terminal management server, etc. Wherein the application development server is configured to process the application project data transmitted from the WEB client; the signature server is configured to signature process the application, and the terminal management server is configured to transmit the application to the POS.

WEB editing software which supports the fifth version of hypertext markup language (HyperText Markup Language 5, HTML5) can be operated on the WEB client or the WEB client may be applied in a POS development application program. In the embodiment, the WEB editing software based on HTML5 is adopted; the designer achieves single-screen interface design by designing an editing area in the WEB editing software, and realizes the design of visualized POS application through functions of the WEB editing software such as program view, attribute view, event design, toll bar and widget box, such that the designer can view the interface style of the application running in the POS during designing. The event design allows the designer to know and edit the motion performed when a widget event is triggered, which reduces the steps of code programming and logic processing for the designer. The WEB client transforms the designed POS application into application project data, sends the application project data to the receiving module 201 as shown in FIG. 2, and saves the application project data into a local database, which assures seamless editing after the internet goes offline, and the validity of the application project data in the local database under a good internet circumstance at the same time, making sure that the application project data is the latest.

The receiving module 201 receives the application project data transmitted from the WEB client; the processing module 202 (i.e., the application development server in the cloud server) saves the application project data into the database; after the application is revised by the WEB client, the processing module 202 revises the corresponding application project data in the database so as to realize data synchronization; the processing module 202 performs validity detection to the application project data, deletes and freezes the application project data which is invalid, generates a project report, etc., based on the compile file generated by the application package data, which is the HTML5 intermediate file, the processing module 202 performs validity detection on the HTML5 intermediate file; the processing module 202 generates a PB file which is executable in the POS on the basis of the HTML5 intermediate file which passes the detection, composites the PB file and an application project resource file to obtain an application project package, processes the application project package to obtain the application package, and transmits the application package to a signature module 203 (i.e., the signing server in the cloud server) to perform signature processing.

The signing module 203 verifies the application package and determines whether the application in the application package meets the requirement. The specific processes are: submitting an application signature and submitting an application, triggering automatic check function or switching to manual verification according to system configuration; after passing the application verification, abstracting an abstract information of a binary file of the application (can be but not limited to hash value), and submitting it to a signer for signing, the returned signature information and the original application being acted as a signature application (the signature information may be added into the end of the original application file to generate a new file); when the verification is passed, the signing module 203 signature processes the application package to obtain a signed application package; the signing module 203 transmits the signed application package to the transmitting module 204 (i.e., the terminal management server of the cloud server); when the verification is not passed, the process to the application package is abandoned, and information on that the application package is not signed is returned to the WEB client.

The transmitting module 204 receives the signed application package, and transmits the signed application package to the POS. the specific transmission mode can be that the receiving module 201 receives the push instruction transmitted from the WEB client; the transmitting module 204 transmits the signed application package to the specified POS based on the push instruction, alternatively, the receiving module 201 receives a request instruction transmitted from the POS; the transmitting module 204 transmits the signed application package to the corresponding POS based on the request instruction. The POS achieves the application required by the designer on the interface of the POS based on the signed application package.

The terminal server further provides the POS with online push and online monitoring service; after the application is developed and signed, the system manager will specify an application to be pushed to the specific POS terminal. The connecting type between the terminal management server and the online POS can be but not limited to Ethernet, wireless communication network, local area network, wireless local area network, VPN and telephone network. The online POS up supplies the working condition and security information of the POS to the terminal management server periodically, and the information includes but not limited to magnetic card feeding times, error record, IC card feeding times, error record, successful/failed trade times, print length of a printer and GPS information of the POS operation. The terminal management server can transmit the specified terminal event and statistic information to the mail, mobile communication device of personal computer of the manager through a variety of modes which include but not limited to email, SMS, page-pushing and real-time communication software. The browser framework of the HTML5-based POS includes an interface rendering plate, a script running plate, a variable managing plate and an event distributing plate, etc. The services provided by the POS includes EMV service, contactless card EMV service, P2PE service, white list service, application management server and terminal health service, etc. Wherein the server management services are the ones that provide install, uninstall, start and stop of the application.

It can be clearly understood for those skilled in the art that for convenience and concision of the description, the specific operation processes of the above-described systems, apparatuses and units can make reference to the correspondence processes in the above mentioned method embodiments, and are not repeated here.

It should be understood that the systems, apparatuses and methods disclosed in some embodiments provided by the present application can also be realized in other ways. For example, the described apparatus embodiments are merely schematic; for example, the division of the units is merely a division based on logic function, whereas the units can be divided in other ways in actual realization; for example, a plurality of units or components can be grouped or integrated into another system, or some features can be omitted or not executed. Furthermore, the shown or discussed mutual coupling or direct coupling or communication connection can be achieved by indirect coupling or communication connection of some interfaces, apparatuses or units in electric, mechanical or other ways.

The units described as isolated elements can be or not be separated physically; an element shown as a unit can be or not be physical unit, which means that the element can be located in one location or distributed at multiple network units. Some or all of the units can be selected according to actual needs to achieve the purpose of the schemes of the embodiments.

Furthermore, each functional unit in each embodiment of the present invention can be integrated into a processing unit, or each unit can exist in isolation, or two or more than two units can be integrated into one unit. The integrated unit can be achieved in hardware or in software function unit.

If the integrated unit is achieved in software functional unit and sold or used as an independent product, the integrated unit can be stored in a computer-readable storage medium. Based on this consideration, the substantial part, or the part that is contributed to the prior art of the technical solution of the present invention, or part or all of the technical solutions can be embodied in a software product. The computer software product is stored in a storage medium, and includes several instructions configured to enable a computer device (can be a personal computer, device, network device, and so on) to execute all or some of the steps of the method of each embodiment of the present invention. The storage medium includes a U disk, a mobile hard disk, a read-only memory (ROM, Read-Only Memory), a random access memory (RAM, Random Access Memory), a disk or a light disk, and other various mediums which can store program codes.

The above embodiments are merely intended to explain the technical solutions of the present invention, but not intended for limitation; although detail description has been made to the present invention with reference to the above embodiments, those ordinarily skilled in the art should understand that modifications to the technical solutions recited in the embodiments, or equivalent replacements to some of the technical features can still be made; these modifications and replacements do not make the substance of corresponding technical solutions depart from the spirit and scope of the technical solutions of each embodiment of the present invention.

What is claimed is:

1. A point of sale (POS) application development method, wherein the method includes following steps:
   by a website client, transforming designed point of sale application into application project data, sending the application project data to a cloud server, and saving the application project data in a local database at the website client;
   by an application development server in the cloud server, receiving and saving the application project data in a database transmitted from the website client;
   by the application development server in the cloud server, processing the application project data and obtaining an application package;
   by a signature server in the cloud server, performing signature process for the application package and obtaining a signed application package;
   by a terminal management server in the cloud server, transmitting the signed application package to a point of sale;
   by a point of sale, realizes a corresponding application based on the signed application package;
   wherein the step of by application development server in the cloud server, processing the application project data and obtaining an application package includes:
   by the application development server in the cloud server, generating a HTML5 intermediate file based on the application project data and performing validity detection on the HTML5 intermediate file;
   by the application development server in the cloud server, generating a powerbuilder-file executable in the point of sale based on the HTML5 intermediate file which passes the validity detection;
   by the application development server in the cloud server, compositing the powerbuilder file and an application project resource file to obtain an application project package; and
   by the application development server in the cloud server, processing the application project package and obtaining the application package; and
   thus, by a designer, completing the design of the point of sale application in the website client connected with the cloud server, without developing and uploading of the point of sale application by the website client.

2. The point of sale application development method of claim 1, wherein the step of by the cloud server, transmitting the signed application package to a point of sale includes:
   by the terminal management server in the cloud server, receiving a push instruction transmitted from the website client;
   by the terminal management server in the cloud server, transmitting the signed application package to the point of sale based on the push instruction.

3. The point of sale application development method of claim 1, wherein the step of by the cloud server, transmitting the signed application package to a point of sale includes:
   by the terminal management server in the cloud server, receiving a request instruction transmitted from the point of sale;
   by the terminal management server in the cloud server, transmitting the signed application package to the point of sale based on the request instruction.

4. The point of sale application development method of claim 1, wherein, after the step of by the application development server in the cloud server, receiving and saving application project data in a database transmitted from a website client, and before the step of by the application development server in the cloud server, processing the application project data and obtaining an application package, the method further includes:
   by the application development server in the cloud server, receiving a modification instruction transmitted from the website client; and
   by the application development server in the cloud server, modifying the application project data stored in a database of the cloud server based on the modification instruction.

5. The point of sale application development method of claim 4, wherein the step of by the signature server in the cloud server, signature processing the application package and obtaining a signed application package includes:
   by the signature server in the cloud server, verifying the application package;
   when the verification of the application package is passed, by the signature server in the cloud server, performing signature processing for the application package and obtaining the signed application package, and transmitting the signed application package to the terminal management server;

when the verification of the application package is not passed, by the signature server in the cloud server, performing other steps abandoning process to the application package, and returning information indicating that the application package is not signed to the website client.

6. The point of sale application development method of claim 5, wherein, by the signature server in the cloud server, verifying the application package specifically comprises:
submitting an application signature submitting application, triggering automatic verification function or switching to a manual verification according to system configuration;
after the application verification is passed, abstracting an abstract information of a binary file of the application, and submitting it for signing, wherein the returned signature information and the original application are used as a signature application together.

7. The point of sale application development method of claim 1, wherein, the website client operates website editing software supporting the fifth version of hypertext markup language; in the website editing software, single-screen interface design is achieved by designing an editing area, and a design of visualized point of sale application is realized through functions of the website editing software including program view, attribute view, event design, toll bar, widget box.

8. The point of sale application development method of claim 1, wherein the step of by application development server in the cloud server, processing the application project data and obtaining an application package further includes:
by the application development server in the cloud server, performing validity detection for the application project data, deleting and freezing the invalid application project data and generating a project report.

9. The point of sale application development method of claim 1, wherein by the terminal management server, further providing the point of sale with online push and online monitoring services.

10. A cloud server, comprising a computer device and a storage medium, the computer device having a hardware processor is configured to perform functional modules stored in the storage medium, and the functional modules includes:
a receiving module configured to receive and save application project data transmitted from a website client; wherein the website client is configured to transform designed point of sale application into application project data, send the application project data to the cloud server, and save the application project data in a local database at the website client thereof;
a processing module configured to process the application project data stored in a database of the cloud server and obtain an application package;
a signing module configured to perform signature process for the application package and obtain a signed application package;
a transmitting module configured to transmit the signed application package to a point of sale so that the point of sale realizes a corresponding application based on the signed application package;
wherein the processing module is specifically configured to:
generate a HTML5 intermediate file based on the application project data and performing validity detection on the HTML5 intermediate file;
generate a powerbuilder file executable in the point of sale based on the HTML5 intermediate file which passes the validity detection;
composite the powerbuilder file and an application project resource file to obtain an application project package;
process the application project package and obtain the application package; and
thus, complete the design of the point of sale application in the website client connected with the cloud server by a designer, without developing and uploading of the point of sale application by the website client.

11. The cloud server of claim 10, wherein:
the receiving module is further configured to receive a push instruction transmitted from the website client;
the transmitting module is further configured to transmit the signed application package to the point of sale based on the push instruction;
alternatively, the receiving module is further configured to receive a request instruction transmitted from the point of sale;
the transmitting module is further configured to transmit the signed application package to the point of sale based on the request instruction.

12. The cloud server of claim 10, wherein:
the receiving module is further configured to receive a modification instruction transmitted from the website client;
the processing module is further configured to modify the application project data based on the modification instruction.

13. The cloud server of claim 10, wherein the terminal management server further provides the point of sale with online push and online monitoring services.

14. The cloud server of claim 10, wherein the processing module is specifically configured to:
perform validity detection for the application project data, delete and freeze the invalid application project data;
generate a project report.

* * * * *